(12) United States Patent
Edwards (10) Patent No.: US 11,015,528 B2
(45) Date of Patent: May 25, 2021

(54) TANK ASSEMBLY

(71) Applicant: ROLLS-ROYCE plc, London (GB)

(72) Inventor: David A. Edwards, Derby (GB)

(73) Assignee: Rolls-Royce plc

( * ) Notice: Subject to any disclaimer, the term of this patent is extended or adjusted under 35 U.S.C. 154(b) by 163 days.

(21) Appl. No.: 16/357,904

(22) Filed: Mar. 19, 2019

(65) Prior Publication Data

US 2019/0309684 A1     Oct. 10, 2019

(30) Foreign Application Priority Data

Apr. 10, 2018   (GB) ...................................... 1805930

(51) Int. Cl.
| | |
|---|---|
| *F02C 7/06* | (2006.01) |
| *F02C 3/06* | (2006.01) |
| *F02C 7/12* | (2006.01) |
| *F01D 25/18* | (2006.01) |
| *F02C 7/32* | (2006.01) |
| *F16N 17/02* | (2006.01) |

(Continued)

(52) U.S. Cl.
CPC ............... *F02C 7/06* (2013.01); *F01D 25/18* (2013.01); *F02C 3/06* (2013.01); *F02C 7/12* (2013.01); *F02C 7/32* (2013.01); *F02C 7/36* (2013.01); *F02K 3/06* (2013.01); *F16N 7/385* (2013.01); *F16N 7/40* (2013.01); *F16N 17/02* (2013.01); *F01D 9/065* (2013.01); *F01M 11/00* (2013.01); *F05D 2260/4031* (2013.01); *F05D 2260/98* (2013.01); *F16N 2210/02* (2013.01); *F16N 2210/12* (2013.01)

(58) Field of Classification Search
None
See application file for complete search history.

(56) References Cited

U.S. PATENT DOCUMENTS 4,020,632 A * 5/1977 Coffinberry ............... F02C 7/14
                                                            60/773
4,062,185 A * 12/1977 Snow ....................... F01D 19/00
                                                            60/204

(Continued)

FOREIGN PATENT DOCUMENTS

| EP | 2559883 | 2/2013 |
|---|---|---|
| EP | 3063390 A1 | 7/2019 |

(Continued)

OTHER PUBLICATIONS

Extended European Search Report dated Aug. 30, 2019 and issued in connection with European Patent Appln. No. 19161932.9.

(Continued)

*Primary Examiner* — Michael Lebentritt
(74) *Attorney, Agent, or Firm* — Barnes & Thornburg LLP (57) ABSTRACT

A tank assembly (100) for a gas turbine engine is provided comprising a tank (102) and a plurality of restraints (112, 114). The restraints (112, 114) include a fixing part (124) for securing the tank (102) to a support structure (104). A first restraint (112) has a first rigidity in the direction of a length of the tank (102) and at least one second restraint (114) has a second rigidity in the direction of the length of the tank (102). Upon thermal expansion or contraction of the tank (102) relative to the support structure (104), the or each second restraint (114) flexes to a greater extent than the first restraint (112).

19 Claims, 6 Drawing Sheets

(51) Int. Cl.
*F02C 7/36* (2006.01)
*F16N 7/40* (2006.01)
*F16N 7/38* (2006.01)
*F02K 3/06* (2006.01)
*F01D 9/06* (2006.01)
*F01M 11/00* (2006.01)

(56) References Cited

U.S. PATENT DOCUMENTS

| | | | | |
|---|---|---|---|---|
| 4,062,186 A * | 12/1977 | Snow | ............... | F02C 7/262 |
| | | | | 60/226.1 |
| 5,738,925 A * | 4/1998 | Chaput | ............... | B32B 3/10 |
| | | | | 428/101 |
| 6,557,814 B1 * | 5/2003 | Rutz | ............... | B60K 15/07 |
| | | | | 248/503 |
| 2007/0068954 A1 * | 3/2007 | Immel | ............... | F17C 1/00 |
| | | | | 220/560.1 |
| 2008/0138554 A1 * | 6/2008 | Maeda | ............... | B29C 66/71 |
| | | | | 428/36.9 |
| 2012/0181288 A1 * | 7/2012 | Childress | ............... | B64D 37/32 |
| | | | | 220/586 |
| 2014/0360152 A1 * | 12/2014 | Waitkus | ............... | F02C 7/06 |
| | | | | 60/39.08 |
| 2015/0343346 A1 * | 12/2015 | Sheridan | ............... | B01D 35/26 |
| | | | | 210/806 |
| 2016/0208651 A1 * | 7/2016 | Dolman | ............... | F16H 57/0475 |
| 2016/0333791 A1 * | 11/2016 | Snyder | ............... | F02C 7/14 |
| 2017/0313434 A1 * | 11/2017 | Peryea | ............... | B64D 37/06 |
| 2019/0338669 A1 * | 11/2019 | White | ............... | F16N 19/00 |
| 2019/0338705 A1 * | 11/2019 | Reid | ............... | F02C 7/32 |
| 2020/0141313 A1 * | 5/2020 | Cooper | ............... | F02C 3/107 |

FOREIGN PATENT DOCUMENTS

EP 3399164 A1 9/2019
WO 2015065525 5/2015

OTHER PUBLICATIONS

Great Britain search report dated Oct. 5, 2018, issued in GB Patent Application No. 1805930.3.

* cited by examiner

TANK ASSEMBLY

CROSS-REFERENCE TO RELATED APPLICATIONS

This specification is based upon and claims the benefit of priority from UK Patent Application Number 1805930.3 filed on 10 Apr. 2018, the entire contents of which are incorporated herein by reference.

BACKGROUND

Technical Field

The present disclosure relates to a tank assembly, in particular a tank assembly for a gas turbine engine. The disclosure also relates to a gas turbine engine comprising such a tank assembly and an aircraft including such a gas turbine engine.

Description of the Related Art

It is known to provide oil tanks within gas turbine engines in order to provide source for oil which can be delivered to the engine and associated parts for cooling and/or lubrication. Oil tanks are generally provided as a component within the main body of the engine. Due to the position of the oil tanks, they can be subject to large variations in temperature which can cause thermal expansion or contraction of the oil tanks. However, more problematic can be the differential thermal expansion of the oil tanks relative to the structure to which they are mounted.

Oil tanks for gas turbine engines are therefore mounted in a manner that allows for relative movement of the oil tank and supporting structure. In general, the oil tanks are formed of a metal such as alloys of aluminium and magnesium or steel. Lugs can be provided on the oil tanks which enable the connection of ball joints and supports, these supports being joined to the supporting structure by another ball joint, creating a statically determinate structure. Differential expansion can then be absorbed through movement of the support.

However, it may be desirable to utilise composite materials for oil tanks. These are more difficult to mount in the known way due to potential issues with the manufacture of lugs for connection, and stress concentrations that may occur in the material at connection points. Moreover, the mountings and tank must be able to withstand high forces and stresses—forces of up to 100 G may be felt be felt by the housing of the engine in the event of a blade-off event in the fan.

SUMMARY

According to a first aspect there is provided a tank assembly for a gas turbine engine, the tank assembly comprising: a tank; and a plurality of restraints spaced apart along a length of the tank, each including a fixing part for securing the tank to a support structure, the plurality of restraints further including a first restraint and at least one second restraint; wherein the first restraint has a first rigidity in a direction along the length of the tank; the or each second restraint has a second rigidity in a direction along the length of the tank that is less than the first rigidity, such that the or each second restraint flexes to a greater extent than the first restraint upon expansion or contraction of the tank relative to the support structure; each restraint is connected to the tank over a connected extent; and the restraints include two side portions, each of the side portions including the connected extent and an unconnected extent that is not directly connected to the tank.

The plurality of restraints may be unitarily-formed with the tank.

The plurality of restraints may be bonded to the tank, for example by an adhesive layer.

The connected extent of the first restraint may be greater than the connected extent of each second restraint.

The side portions of the second restraints may be configured to have a rigidity in the direction along the length of the tank that is less than the side portions of the first restraint.

The unconnected extent of each restraint may extend from a fixing part of each restraint to the connected extent of each restraint.

The side portions of the second restraint between the fixing part and the connected extent may have a rigidity in the direction along the length of the tank that is less than the side portions of the first restraint between the fixing part and the connected extent.

The unconnected extent of the side portions of the second restraint may be longer than the unconnected extent of the side portions of the first restraint.

The side portions of the second restraints may have a smaller cross-sectional area than the top portion of the second restraints.

The plurality of restraints may be substantially U-shaped, including a top portion and two side portions, and extend around top and side surfaces of the tank.

The second restraints may be connected to the tank on only a single surface of the tank; the single surface may be the top surface.

The plurality of restraints may comprise elongate members.

A portion of the first restraint may have a width that is greater than a width of a corresponding portion of the second restraints.

The plurality of restraints may comprise composite materials such as carbon fibre and BMI resin.

Two second restraints may be positioned at or towards opposing ends of the tank and the first restraint may be interposed between the two second restraints.

The first restraint may be positioned substantially centrally relative to the tank.

The support structure may be a core housing of the gas turbine engine.

According to a second aspect, there is provided a gas turbine engine for an aircraft, the gas turbine engine comprising: an engine core comprising a turbine, a compressor, and a core shaft connecting the turbine to the compressor; a fan located upstream of the engine core, the fan comprising a plurality of fan blades; a support structure; and a tank assembly according to the first aspect, the tank assembly being secured to the support structure by the fixing part.

The fixing part may be secured to the support structure by at least one fastener.

The gas turbine engine may further comprise a gearbox that receives an input from the core shaft and outputs drive to the fan so as to drive the fan at a lower rotational speed than the core shaft.

The support structure may comprise a core housing of the gas turbine engine, the core housing surrounding the engine ore.

The turbine may be a first turbine, the compressor may be a first compressor, and the core shaft may be a first core shaft; the engine core may further comprise a second turbine, a second compressor, and a second core shaft connecting the second turbine to the second compressor; and the second turbine, second compressor, and second core shaft may be arranged to rotate at a higher rotational speed than the first core shaft.

According to a third aspect, there is provided an aircraft including a gas turbine engine according to the second aspect.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

DESCRIPTION OF THE DRAWINGS

Embodiments will now be described by way of example only, with reference to the Figures, in which.

DETAILED DESCRIPTION

Figure 1:
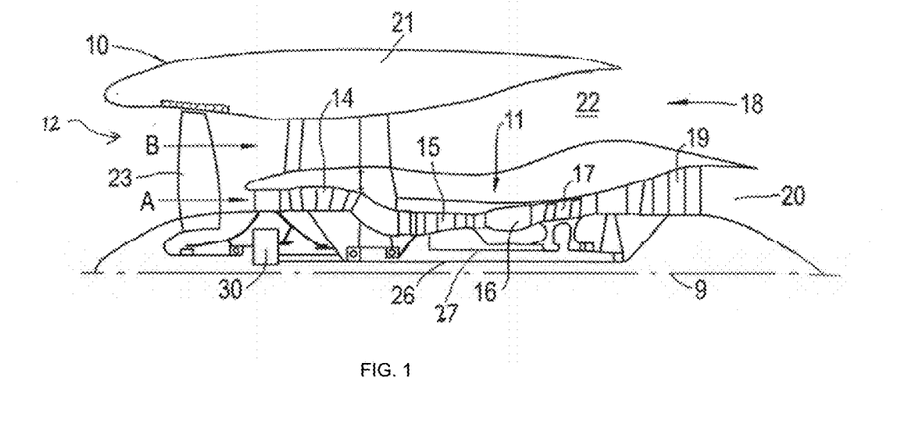
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
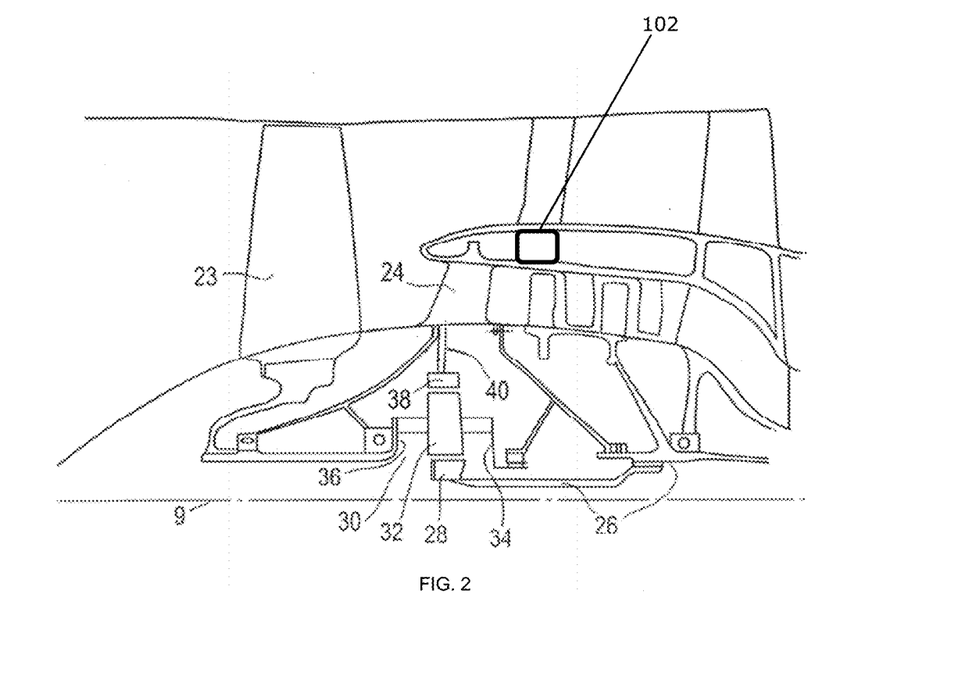
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
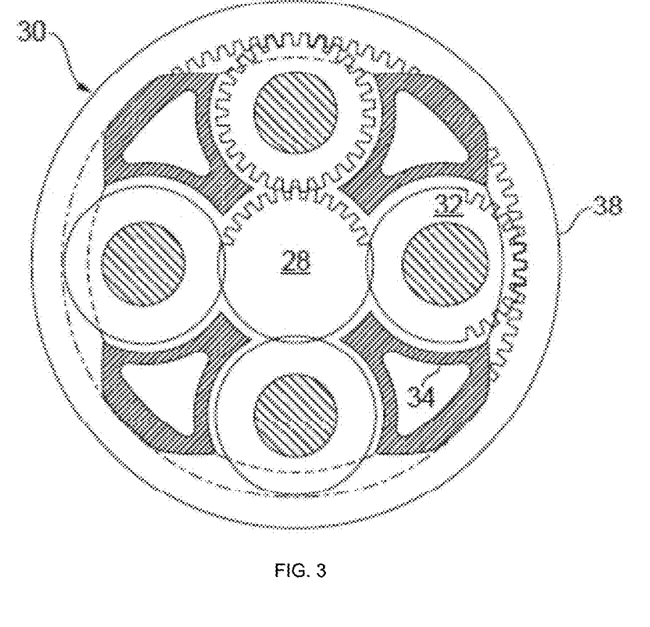
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 20, 22 meaning that the flow through the bypass duct 22 has its own nozzle that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
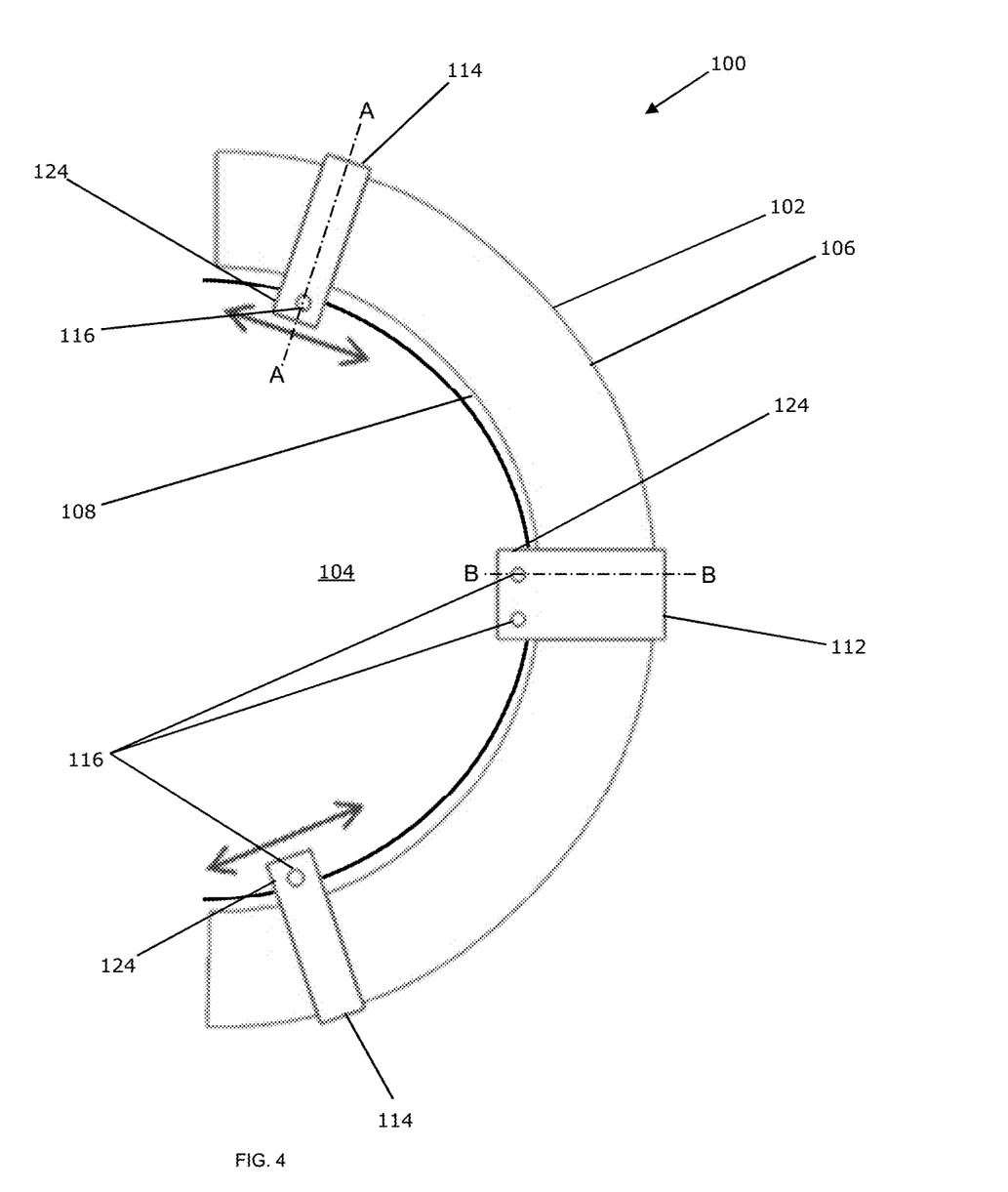
FIG. 4 is a side view of a tank assembly according to the present disclosure.

Now referring to FIG. 4, there is shown a tank assembly 100 in accordance with the present disclosure. The tank assembly 100 includes a tank in the form of an oil tank 102, this oil tank 102 also being shown in situ within the gas turbine engine in FIG. 2. The oil tank 102 is elongate and extends around a support structure 104 in the form of a core housing of a gas turbine engine. In the depicted embodiment the support structure 104 has a curved outer surface, the oil tank 102 having a longitudinal extent that substantially conforms to the support structure 104. As such, the oil tank 102 has a substantially semi-circular profile when viewed from the front of the core housing. This helps to avoid wasted space in the gas turbine engine.

In the depicted embodiment, the support structure 104 is a core housing of a gas turbine engine. However, in other embodiments other shapes of support structure may be provided, the oil tank being of a shape that may or may not directly conform to the support structure, dependent on particular design considerations and the presence or absence of other components. The oil tank 102 has a substantially rectangular cross-section including rounded corners, the rounded corners decreasing stress concentration in the tank. The oil tank 102 can be considered to be formed with a top surface 106, bottom surface 108, and two side surfaces 110 interconnecting the top and bottom surfaces 106, 108.

The oil tank 102 is secured to the support structure 104 by a mounting assembly comprising three restraints: a first restraint 112 and two second restraints 114. Each restraint 112, 114 operates to constrain the movement of the oil tank 102 in at least one direction, together preventing its movement relative to the support structure 104. In use, it is known that the oil tank 102 is subject to large temperature fluctuations and therefore differential expansion of the oil tank 102 and support structure 104 is common. The mounting assembly must therefore allow for this differential expansion whilst ensuring the secure mounting of the oil tank 102.

In the depicted embodiment, the first restraint 112 is positioned substantially centrally along a longitudinal extent of the oil tank 102 and is interposed between the two second restraints 114, which are positioned towards the opposing ends of the oil tank 102.

Figure 5:
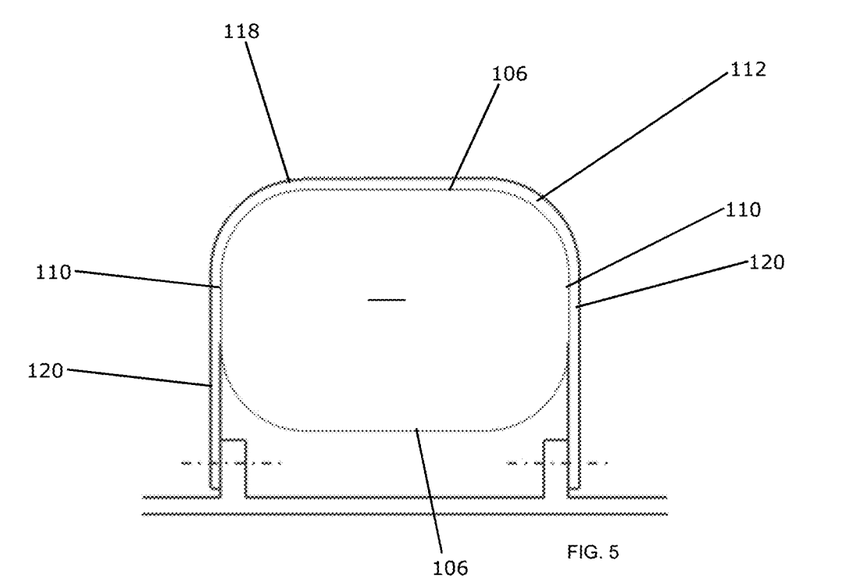
FIG. 5 is a sectional view through the oil tank and first restraint of FIG. 4, along line A-A.
Figure 6:
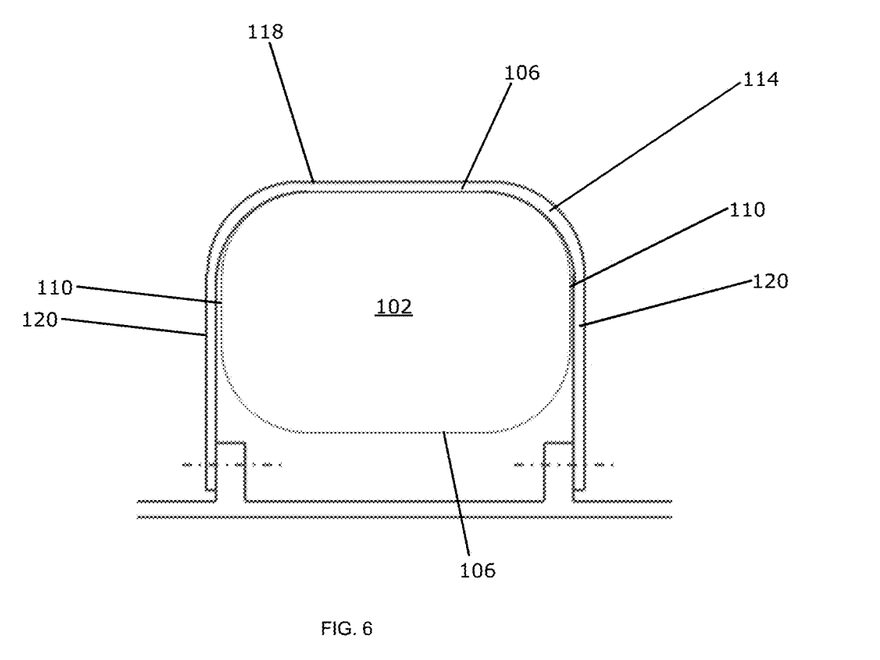
FIG. 6 is a sectional view through the oil tank and first restraint of FIG. 4, along line B-B.

The first restraint 112 is shown in cross-section in FIG. 5 and comprises an elongate strap. The first restraint 112 wraps around to conform to the top and side surfaces 106, 110 of the oil tank 102, forming a U-shape, and is secured to the support structure 104 at or towards either end. As shown in FIG. 6, the second restraints 114 also have this same cross-sectional profile. However, the first restraint 112 is substantially wider than the second restraints 114—in the depicted embodiment approximately twice as wide. This means that the first restraint 112 has a higher stiffness or rigidity than the second restraints 114 in the direction of the longitudinal extent of the oil tank 102, where the restraints 112, 114 are formed of the same material or materials.

The first and second restraints 112, 114 are attached to the support structure 104 by a plurality of fasteners 116, which in the depicted embodiment are rivets. It will be apparent that fasteners 116 are used on each end of the restraints 112, 114, although only one end of each restraint 112, 114 is visible in FIG. 4. The skilled person will be aware that any suitable fastener 116 may be used. Alternatively, permanent fastening methods may be utilised such as adhesive bonding, welding, or brazing, dependent upon the specific materials used for both the restraints 112, 114 and the support structure 104.

In the depicted embodiment, a plurality of fasteners 116 is provided on a fixing part 124 of the first restraint 112. By providing multiple fasteners 116, the stresses on each fastener 116 may be decreased, which may be especially advantageous where composite materials are used. Multiple fasteners 116 may be used on the fixing parts 124 of the second restraints 114, also, if the expected stresses require it. This will be apparent to the skilled person.

In cross-section, the second restraints 114 are substantially identical to the first restraint 112. However, where the first restraint 112 and second restraint 114 differ is in their connection to the oil tank 102.

It can be seen in FIG. 5 that the first restraint 112 is bonded to the oil tank 102 along substantially an entire contact surface between the first restraint 112 and the oil tank 102. Specifically, this means that the first restraint 112 is bonded along both the top surface 106 of the oil tank 102 and the two side surfaces 110 by its top portion 118 and side portions 120 respectively, including the two corner portions. As such, the oil tank 102 is restrained from movement relative to the first restraint 112, with only a minimum of flexure enabled by the slight gap between the oil tank 102 and the support structure 104. This slight gap may allow slight relative movement of the oil tank 102 and support structure 104.

The side portion 120 where it is connected to the oil tank 102 forms a connected extent and where it is not connected to the oil tank 102 forms an unconnected extent. Were the restraint 112 to be formed integrally with the oil tank 102, the connected extent may be considered to be where the side portion 120 joins the remainder of the oil tank 102.

In comparison, the second restraints 114—as shown in relation to one second restraint 114 in FIG. 6, but also applicable to the other second restraint 114—are bonded to the oil tank 102 along only the top surface 106 of the oil tank 102. As such, relative movement of the second restraints 114 and oil tank 102 is prevented along the top surface 106 but is enabled along the side surfaces 110 of the oil tank 102.

In use, thermal expansion of the oil tank 102, in conjunction with the static fixing of the oil tank 102 at the first restraint 112, will result in the ends of the oil tank 102 moving in opposing directions. As the oil tank 102 is fixed to the second restraints 114 by its top surface 106, this part will remain bonded, but the long length of non-bonded second restraint 114 will ensure that flexure of the second restraints 114 is enabled for a far greater length of restraint 114 than is possible for the first restraint 112; the restraints 112, 114 can flex along their lengths at all points that are not subject to bonding or attachment to another component. The allowance of flexure is further enhanced by the narrower width of the second restraints 114 as opposed to the width of the first restraint 112.

The bonding of the restraints 112, 114 to the oil tank 102 is provided by a bonding resin, for example bismaleimide (BMI) resin. Other bonding resins or adhesives may be utilised, as long as they are suitable for bonding the particular materials and composites involved.

In the present embodiment, the oil tank 102 and restraints 112, 114 are both made from the same composite material, including carbon fibre and BMI resin. Other such composite materials may be used, as would be appreciated by the skilled person. However, it may also be possible to replace the composite material with other materials such as metal alloys that provide the same or comparable strength and rigidity as the above-described composites.

As is clear, the restraints 112, 114 are U-shaped in order that they closely conform to the shape of the oil tank 102. Therefore, where the oil tank 102 differs in shape it may also be desired to alter the shape of the restraints 112, 114. For example, where the oil tank 102 has a circular or oval cross-section, the restraints 112, 114 may form a D-shape. In general, the restraints 112, 114 may have any cross-section that enables the bonding to be positioned along enough length of the restraint 112, 114 to give strength to the mounting, especially in relation to the first restraint 112. The second restraints 114 may have a different cross-section to the first restraint 112, in view of the fact that they require a lesser amount of bonding and therefore the contact area between the second restraints 114 and the oil tank 102 may accordingly be smaller.

Figure 7A:
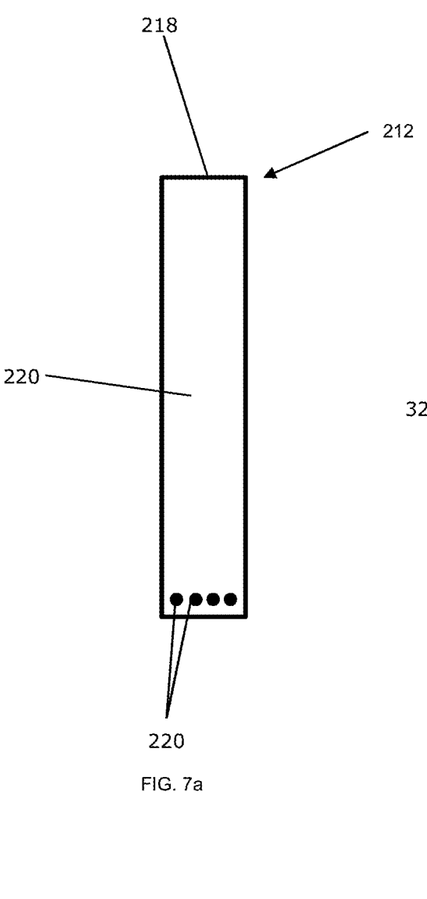
FIG. 7a is a side view of two restraints.
Figure 7B:
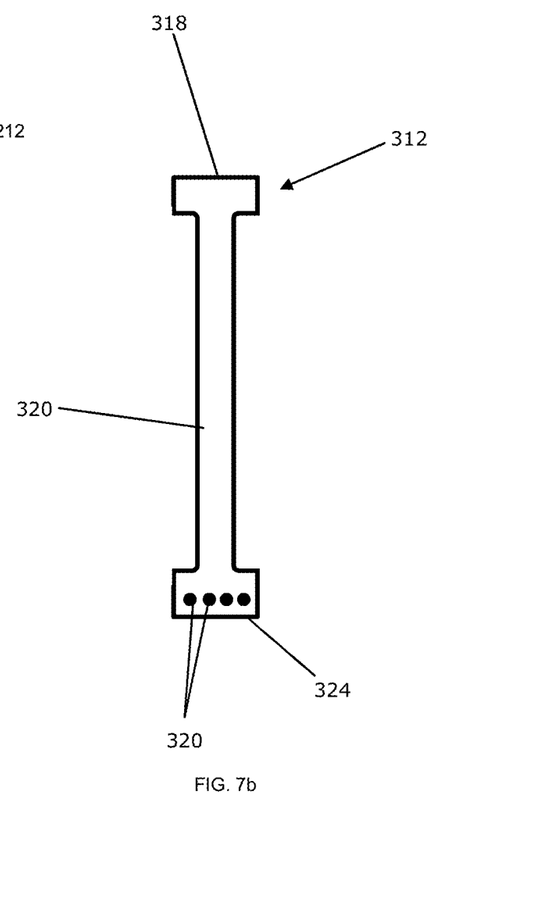
FIG. 7b is a side view of two restrains.

Shown in FIGS. 7a and 7b are two restraints 212, 312, usable as either first restraints or second restraints. Each restraint 212, 312 is shown in side-view, the top of the restraint 212, 312 being the transition between the side portion 220, 320 and the top portion 218, 318 of the restraint; the side portions 220, 320 of the restraints 212, 312 differ, as can be seen. The restraints 212, 312 of FIGS. 7a and 7b each include four fixture points 222, 322 at each end, although only one end is visible—the other end being a mirror image of the visible end. The four fixture points 222, 322 allow the stresses endured by the restraints 212, 312 to be spread amongst a greater number of fasteners 116 than the restraints 112, 114 of FIGS. 4 and 5, thus decreasing stress concentration. The restraint 212 of FIG. 7a is otherwise identical to those of FIGS. 4 and 5, with a consistent cross-section along its length.

In comparison, the restraint 312 of FIG. 7b has a fixing part 324 and top portion 318 that are identical to those of FIG. 7a, but with a different side portion 320. The side portion 320 of the restraint 312 of FIG. 7b has a narrower width than the corresponding portion of the restraint 212 of FIG. 7a. As such, and as the restraints 212, 312 are made of the same material, the side portion 320 will have a lower rigidity than the corresponding portion of FIG. 7a. The lower rigidity will increase flex of the restraint 312 upon loading due to expansion or contraction of the oil tank to which it is connected.

Although shown along a majority of the length of the side portion 320 of the restraint 312 of FIG. 7b, a narrowing could be used at any point along the length and for a varying portion of the side portion, depending upon the amount of rigidity required from the individual design of the restraint 312. Moreover, the narrowing could involve multiple sections of different widths, or sections with a varying width, each of which would introduce slightly different rigidity characteristics for the restraint 312.

Thus far, the restraints have been described as being formed as elements separate from the oil tank. However, it is also possible to form one or more of the first and second restraints in a single piece with the oil tank. Such a possibility is shown in FIGS. 8 and 9, which show a cross-section through a first restraint 412 and a second restraint 512, respectively.

Figure 8:
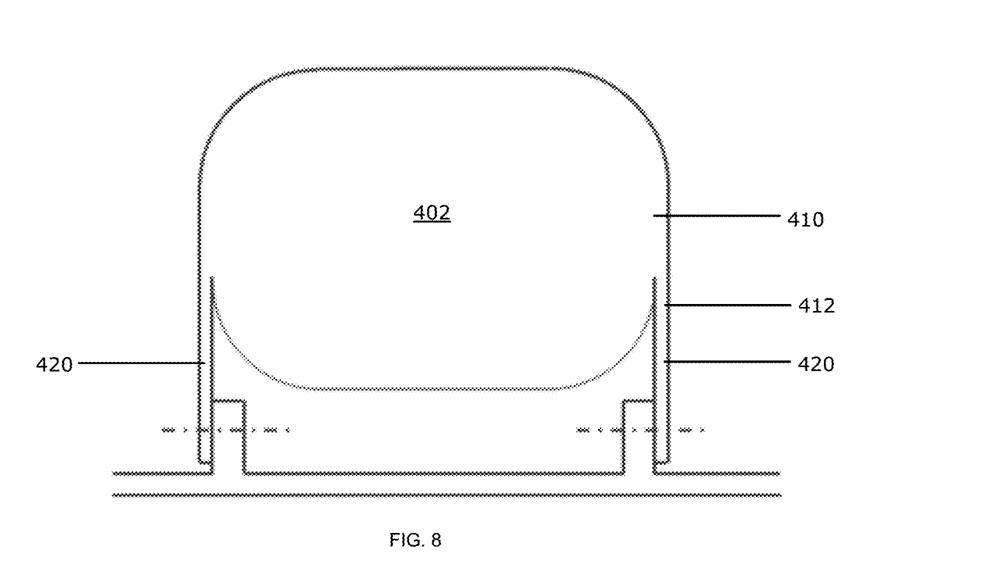
FIG. 8 is a sectional view through a first restraint of a second embodiment of a tank assembly; and, FIG. 9 is a sectional view through a second restraint of the tank assembly of FIG. 8.
Figure 9:
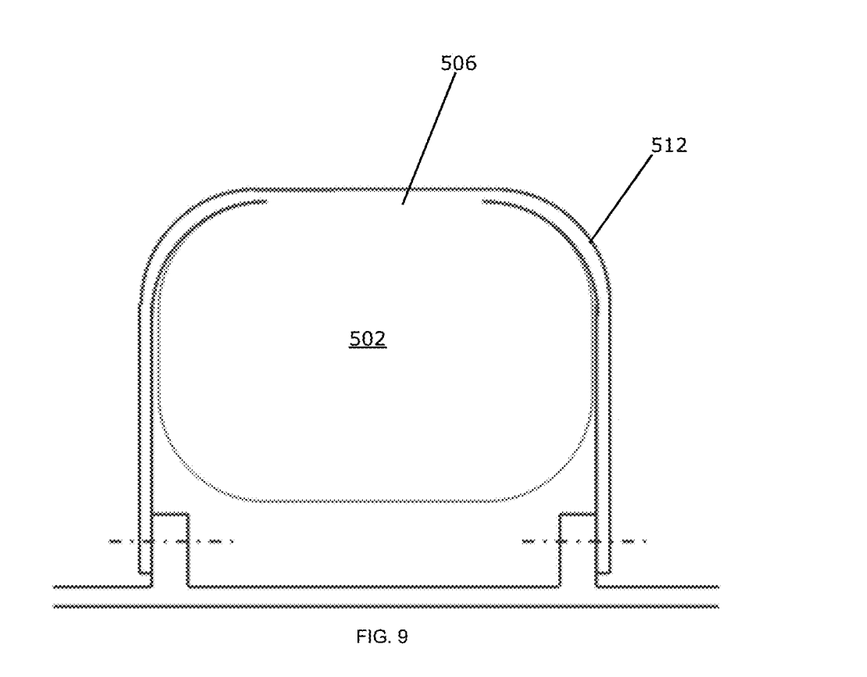

As can be seen, the restraint 412 of FIG. 8 is formed unitarily with the oil tank 402 such that only a side portion 420 below the side surface 410 of the oil tank 402 is free to move relative to the oil tank 402. In comparison, the restraint 512 of FIG. 9, although still formed unitarily with the oil tank 502, is only connected to the oil tank 502 along the top surface 506 of the oil tank 502. As such, in comparison to the restraint 412 of FIG. 8, the restraint 512 of FIG. 9 will be enabled to move relative to the oil tank 502 along a greater extent of the restraint 512.

Similarly to when the restraints are formed separately from the oil tank, the restraints formed unitarily with the oil tank need not necessarily differ in their points of contact with the oil tank. The rigidity difference between the first restraint and second restraints may be provided through any, or a combination, of a difference in the length of the restraints that is free to move relative to the oil tank, a difference in the cross-sectional area of the restraints, a difference in the material forming the restraints, or any other difference, the possibilities being clear to the skilled person.

It is apparent that the difference in rigidity of the first restraint and the second restraints must be great enough to allow the tank to expand over the full range of temperatures to which it is exposed during operation. For example, the oil temperature range may extend from −40° C. to 160° C. Moreover, the rigidity should allow flexibility without failure of any single component, in normal use. Thus, flexibility may be allowed which allows the accommodation of the full temperature range of both the oil tank and the support structure to which it is attached, whichever has the higher temperature at any time. At either extreme of temperature, the stresses in the oil tank and support structure, due to the restraints, should be below the respective endurance limits, these limits being known to the skilled person. The system may be designed such that the actual stresses experiences have a minimal effect on the stress analyses of any other component of the gas turbine engine. Worst case loading may be during a fan blade off event or a core blade off event.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

I claim:

1. A tank assembly for a gas turbine engine, the tank assembly comprising:
   a tank; and
   a plurality of restraints spaced apart along a length of the tank, each including a fixing part for securing the tank to a support structure, the plurality of restraints including a first restraint and at least one second restraint;
   wherein the first restraint has a first rigidity in a direction along the length of the tank;
   the or each second restraint has a second rigidity in a direction along the length of the tank that is less than the first rigidity;
   each restraint is connected to the tank over a connected extent; and
   the restraints each include two side portions, each of the side portions including the connected extent and an unconnected extent that is not directly connected to the tank,
   wherein the plurality of restraints are substantially U-shaped, including a top portion and two side portions, and extend around top and side surfaces of the tank.

2. The tank assembly as claimed in claim 1, wherein the plurality of restraints are unitarily-formed with the tank.

3. The tank assembly as claimed in claim 1, wherein the plurality of restraints are bonded to the tank.

4. The tank assembly as claimed in claim 1, wherein the connected extent of the first restraint is longer than the connected extent of each second restraint.

5. The tank assembly as claimed in claim 1, wherein side portions of the second restraints are configured to have a rigidity in the direction along the length of the tank that is less than the side portions of the first restraint.

6. The tank assembly as claimed in claim 1, wherein the unconnected extent of each restraint extends from the fixing part of each restraint to the connected extent of each restraint.

7. The tank assembly as claimed in claim 6, wherein the side portions of the second restraint between the fixing part and the connected extent have a rigidity in the direction along the length of the tank that is less than the side portions of the first restraint between the fixing part and the connected extent.

8. The tank assembly as claimed in claim 1, wherein the unconnected extent of the side portions of the second restraint is longer than the unconnected extent of the side portions of the first restraint.

9. The tank assembly as claimed in claim 1, wherein the side portions of the second restraints have a smaller cross-sectional area than the top portion of the second restraints.

10. The tank assembly as claimed in claim 1, wherein the second restraints are connected to the tank on only a single surface of the tank.

11. The tank assembly as claimed in claim 1, wherein a portion of the first restraint has a first width that is larger than a second width of a corresponding portion of the second restraints.

12. The tank assembly as claimed in claim 1, wherein the plurality of restraints comprise composite materials including carbon fibre and BMI resin.

13. A tank assembly for a gas turbine engine, the tank assembly comprising:
- a tank; and
- a plurality of restraints spaced apart along a length of the tank, each including a fixing part for securing the tank to a support structure, the plurality of restraints including a first restraint and at least one second restraint;
- wherein the first restraint has a first rigidity in a direction along the length of the tank;
- the or each second restraint has a second rigidity in a direction along the length of the tank that is less than the first rigidity;
- each restraint is connected to the tank over a connected extent; and
- the restraints each include two side portions, each of the side portions including the connected extent and an unconnected extent that is not directly connected to the tank,
- wherein two second restraints are positioned at or towards opposing ends of the tank and the first restraint is interposed between the two second restraints.

14. A gas turbine engine for an aircraft, the gas turbine engine comprising:
- an engine core comprising a turbine, a compressor, and a core shaft connecting the turbine to the compressor;
- a fan located upstream of the engine core, the fan comprising a plurality of fan blades;
- a support structure; and
- a tank assembly, the tank assembly comprising:
- a tank; and a plurality of restraints spaced apart along a length of the tank, each including a fixing part for securing the tank to a support structure, the plurality of restraints including a first restraint and at least one second restraint;
- wherein the first restraint has a first rigidity in a direction along the length of the tank;
- the or each second restraint has a second rigidity in a direction along the length of the tank that is less than the first rigidity;
- each restraint is connected to the tank over a connected extent; and
- the restraints each include two side portions, each of the side portions including the connected extent and an unconnected extent that is not directly connected to the tank, the tank assembly being secured to the support structure by the fixing part,
- wherein the plurality of restraints extend around top and side surfaces of the tank.

15. The gas turbine engine as claimed in claim 14, wherein the fixing part is secured to the support structure by at least one fastener.

16. The gas turbine engine as claimed in claim 14, further comprising a gearbox that receives an input from the core shaft and outputs drive to the fan so as to drive the fan at a lower rotational speed than the core shaft.

17. The gas turbine engine as claimed in claim 14, wherein the support structure comprises a core housing of the gas turbine engine, the core housing surrounding the engine core.

18. The gas turbine engine according to claim 14, wherein:
- the turbine is a first turbine, the compressor is a first compressor, and the core shaft is a first core shaft;
- the engine core further comprises a second turbine, a second compressor, and a second core shaft connecting the second turbine to the second compressor; and
- the second turbine, second compressor, and second core shaft are arranged to rotate at a higher rotational speed than the first core shaft.

19. An aircraft including a gas turbine engine according to claim 18.

* * * * *